United States Patent [19]

Howard et al.

[11] 3,743,070
[45] July 3, 1973

[54] CLUTCH WITH BRAKE HAVING TORSIONAL RESILIENCE

[75] Inventors: Wayne R. Howard; Richard L. Ratliff, both of Jackson, Mich.

[73] Assignee: Clark Equipment Company, Buchanan, Mich.

[22] Filed: Dec. 10, 1971

[21] Appl. No.: 206,697

[52] U.S. Cl........ 192/113 R, 192/18 A, 188/218 X, 192/70.17, 192/91 A
[51] Int. Cl. ........................................... F16d 67/04
[58] Field of Search ......................... 192/13 R, 18 A

[56] References Cited
UNITED STATES PATENTS
| | | | |
|---|---|---|---|
| 1,787,160 | 12/1930 | Moorhouse | 192/13 |
| 3,667,583 | 6/1972 | Richards | 192/18 A |
| 3,540,557 | 11/1970 | Hasselbacher | 192/18 A |

*Primary Examiner*—Benjamin W. Wyche
*Attorney*—Kenneth C. Witt, Robert J. Norton et al.

[57] ABSTRACT

A transmission is disclosed having a clutch brake for holding the transmission main shaft from rotation when the transmission main clutch is disengaged. The clutch brake includes a friction disc rotatable about the axis of te main shaft and interleaved between a pair of friction discs connected to the housing. A tab extending from the rotatable friction disc may engage the main shaft so that the shaft may not rotate when the rotatable friction disc is braked, but the tab does permit a certain amount of angular pivotal movement between the shaft and the rotatable friction disc. A torsional coiled wire spring resiliently connects the rotatable friction disc with the main shaft and biases the shaft toward a centered position relative to the disc tab so that the shaft may pivot slightly in either direction while brake from rotation to permit the various geared and splined components of the transmission to be shifted into engagement with their mating components regardless of the angular position at which the clutch brake stops the main shaft.

15 Claims, 3 Drawing Figures

PATENTED JUL 3 1973     3,743,070

INVENTORS
WAYNE R. HOWARD
RICHARD L. RATLIFF
BY
*Robert J. Horton*
ATTORNEY

CLUTCH WITH BRAKE HAVING TORSIONAL RESILIENCE

BACKGROUND OF THE INVENTION

The field of art to which this invention pertains includes mechanical power transmissions, and more specifically transmissions wherein the main clutch is exposed to a cooling fluid to improve the performance and life of the clutch mechanism.

Friction clutches have long been employed in mechanical power transmissions to selectively connect and disconnect the power source with the transmission's main shaft so that various gears within the transmission may be moved or shifted into and out of mesh with each other to provide a plurality of speed ratios "across" the transmission. Of recent years it has been found that by exposing the frictional surfaces of the clutch mechanism to a flow or spray of cooling fluid the performance, life, and cost of the clutch itself may be improved; but such improvements have come at the cost of certain detrimental side effects. For example, due to the presence in such clutches of viscous fluid between the frictional surfaces connected for rotation with the power source (usually the flywheel and pressure plate) and the frictional surfaces connected for rotation with the main shaft (usually the clutch disc) some turning torque is transmitted through the cooling fluid so that the main shaft continues to rotate even when the main clutch is disengaged and the transmission is in neutral. It will be understood that continued rotation of the transmission's main shaft when the transmission is in neutral creates a serious problem in that undue clashing of spline and gear teeth may occur when it is attempted to shift non-rotating gear and dog clutch components into mesh with their mating counterparts carried by the rotating shaft. In an effort to solve this problem certain types of braking mechanisms have been incorporated into transmissions having such "wet" clutches in order to brake the rotation of the shaft and hold it from rotation when the transmission is in neutral, these clutch brakes usually taking one of two forms. The simplest form of such clutch brake is a brake mechanism which is constantly applied to exert a constant braking torque upon the main shaft and, while this type of clutch brake is effective to hold the shaft from rotation when the transmission is in neutral, a certain detriment in overall efficiency is experienced by a transmission having such a constantly applied brake. Another type of clutch brake is disclosed in U.S. Pat. No. 3,540,557 issued on Nov. 17, 1970 to Roland E. Hasselbacher, this brake being applied to hold the main shaft from rotation only when the main clutch is disengaged and the transmission is in netural. Although these types of clutch brakes have been satisfactory to their purpose, they give rise to another problem due to the fact that the main shaft of a transmission having such a clutch brake may not pivot at all when the transmission is in neutral. Consequently, if, when the main clutch is disengaged, the main shaft is randomly stopped by the clutch brake at an angular position whereat the tooth ends of splined or geared components connected for rotation with the shaft are aligned with the tooth ends of the corresponding components into which the mating shaft components are to be axially moved, the tooth ends may abut one another and the desired shifting of gears may not be performed.

One of the various objects of our invention is to provide a clutch brake mechanism which is engaged to brake the rotation of a transmission main shaft only when the transmission main clutch is disengaged, and which further provides a selected amount of pivotal or angular freedom to the main shaft so that the teeth of mating splined or geared components may be shifted into engagement with each other regardless of the angular position at which the main shaft is stopped.

SUMMARY OF THE INVENTION

In carrying out this invention in one form thereof a transmission is provided having a rotatable torque input member, a rotatable torque receiving member and a main clutch for selectively connecting the input member to rotate the receiving member. A friction member is connected to the transmission housing to remain stationary and a rotatable friction member is disposed adjacent the stationary friction member and rotatable about the axis of rotation of the torque receiving member. The torque receiving member and the rotatable friction member are connected together by a resilient means so that this friction member is urged to rotate with the receiving member, the resilient means permitting angular pivotal movement between the rotatable friction member and the receiving member while at the same time biasing the receiving member toward a selected angular position relative to this friction member.

The objects, features, and advantages of this invention will be better appreciated when the following detailed description of an embodiment thereof is taken in conjunction with the drawing.

DESCRIPTION OF THE EMBODIMENT

Figure 1:
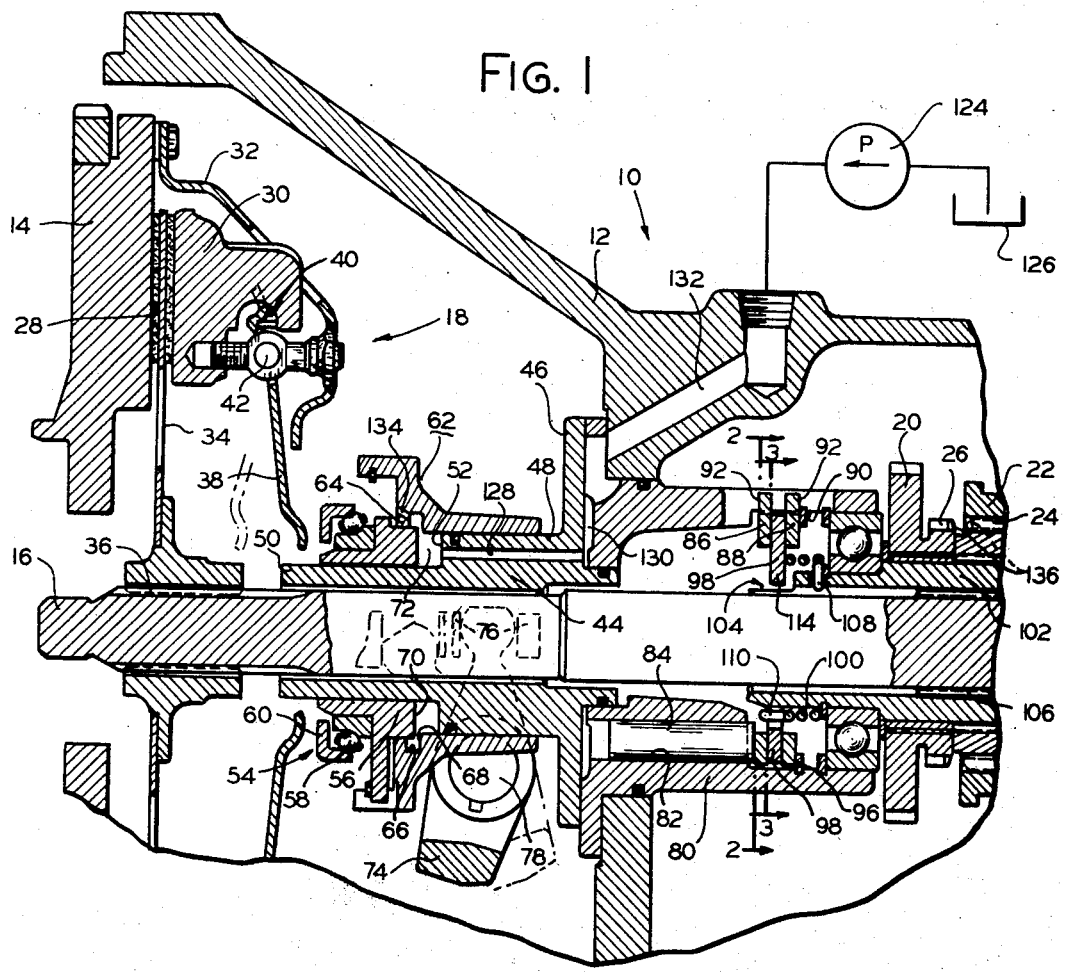
FIG. 1 is a partial side sectional view of a transmission embodying this invention.

Referring to FIG. 1 of the drawing, a transmission embodying one form of clutch brake mechanism according to this invention is indicated generally by the numeral 10. The components of transmission 10 are contained within a stationary housing 12 and include a flywheel 14 which may be connected to any suitable power source (not shown) to act as a torque input member, a rotatable main shaft 16 which acts as a torque receiving member, and a main clutch indicated at 18 which is adapted to selectively connect flywheel 14 and main shaft 16 together for conjoint rotation. Torque may be delivered from main shaft 16 by means of a gear 20 rotatably mounted upon the shaft, and to this end a collar 22 which is connected for rotation with the shaft is axially movable toward gear 20 and has a plurality of splines 24 which may engage the splines 26 formed in a web extending from gear 20 so that when the collar is moved toward the gear the splines 24 and 26 engage to connect gear 20 for rotation with main shaft 16. Main clutch 18 basically includes a back-up surface 28 on flywheel 14, an axially movable pressure ring 30 connected for rotation with flywheel 14 by means of clutch cover plate 32, and a clutch disc 34 splined at 36 for rotation with main shaft 16 and interleaved between the pressure ring and the back-up surface. Pressure ring 30 is biased toward back-up surface 28 by means of a plurality of circumferentially located compression springs (not shown) and when clutch 18 is engaged the forces of these springs are unopposed so that clutch disc 34 is frictionally clutched between the pressure ring and back-up surface to thereby connect main shaft 16 for rotation with flywheel 14. A plurality of throwout levers 38 are connected to pressure plate 30 as indicated at 40 and these levers are pivotally connected to cover plate 32 at the fulcrum point 42 so that when it is desired to disengage the clutch for the free rotation of main shaft 16 the throwout levers may be pivoted about point 42 to move pressure plate 30 out of clutching engagement with disc 34.

A quill 44 is fixedly connected to housing 12 by means of the flanged portion 46 and this quill has a first portion 48, a reduced diameter portion 50, and a shoulder 52. Slidably disposed on reduced diameter portion 50 is a bearing carrier assembly 54 which includes a sleeve 56 on which a throwout bearing 58 is mounted. Throwout bearing 58 includes a ring 60 which is engageable with the radially inner ends of throwout levers 38 for the disengagement of clutch 18 in the well known manner. A collar 62 is slidably disposed on portion 48 of stationary quill 44 and a flange type portion 64 of collar 62 is closely telescoped over sleeve 56. Collar 62 includes an annular groove 66 in the wall thereof which has a side 68 that can be brought into abutment with the adjacent end 70 of sleeve 56, and it will now be noted that quill 44, sleeve 56, and collar 62 define a fluid chamber 72 which includes groove 66. Collar 62 is movable longitudinally on quill 44 by means of a yoke 74 which engages a pair of lugs 76 extending from either side of collar 62, and yoke 74 is pivotal about the point 78 by means of any suitable linkage connecting the yoke to an operator foot pedal (not shown) for the engagement and disengagement of clutch 18.

Figure 2:
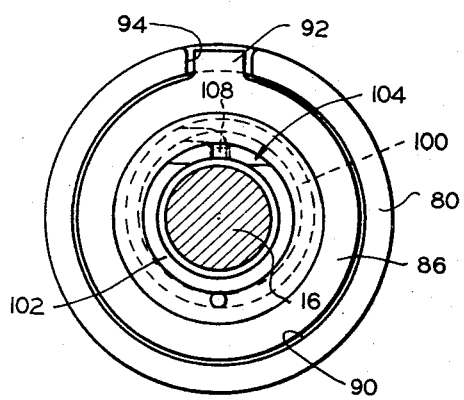
FIG. 2 is a sectional view along the lines 2—2 of FIG. 1 showing a portion of the transmission's components to advantage.

Housing 12 includes a stationary annular portion 80 extending essentially concentric with main shaft 16 and a plurality of circumferentially located piston cylinders 82 are formed in portion 80, each piston cylinder having a piston 84 slidably disposed therein. A pair of friction discs 86 and 88 are disposed within an enlarged bore 90 in annular portion 80 and, as best illustrated in FIG. 2 of the drawing, these discs 86 and 88 are loosely keyed to annular portion 80 by means of tabs 92 whose circumferential dimension is somewhat less than the circumferential dimension of the axially extending slot 94 in annular portion 80 within which these tabs are received.

Figure 3:
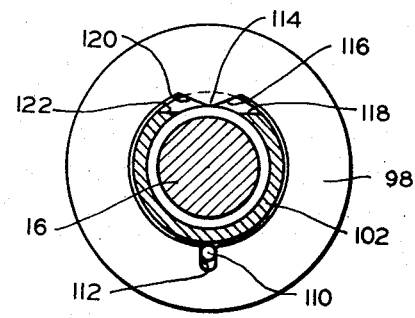
FIG. 3 is a sectional veiw along the line 3—3 of FIG. 1 showing another portion of the transmission's components to advantage.

Referring again speicifically to FIG. 1, stationary disc 86 is disposed adjacent the ends of pistons 84, stationary disc 88 is restrained from axial movement to the right in FIG. 1 by means of the snap ring 96, and a rotatable friction disc 98 is interleaved between disc 86 and disc 88. Disc 98 is resiliently connected for rotation with main shaft 16 by any suitable resilient means adapted to provide the function hereinafter explained, such resilient means in this embodiment comprising a torsional coiled wire spring 100 connected between shaft 16 and friction disc 98. A quill shaft 102 having a flatted portion 104 is splined at 106 for rotation with main shaft 16 and the radially turned end 108 of spring 100 is received in a radial bore in quill shaft 102 (FIGS. 1 and 2) to connect one end of the spring for rotation with the main shaft. Referring now to FIG. 3 in conjunction with FIG. 1, the other end 110 of spring 100 is turned in an axial direction and received in a slot 112 formed in rotatable disc 98 to thereby connect this other end of the spring with the rotatable friction disc. In order to provide means for limiting the angular pivotal movement of friction disc 98 relative to quill shaft 102 (and main shaft 16) an open V shaped tab 114 (FIG. 3) extends radially inward from disc 98 into the area of flatted portion 104 so that the side surface 116 of tab 114 may abut the surface 118 of flatted portion 104 to limit the clockwise movement of disc 98 relative to shaft 16 and the side surface 120 may abut the surface 122 to limit such counterclockwise movement. The angular "free length" of spring 100 is selected so that shaft 16 is biased toward the centered position shown in FIG. 3 relative to friction disc 98, and the torsional spring rate of spring 100 is selected to permit shaft 16 to be pivoted relative to disc 98 within the limits defined by tab 114. If desired, a spring (not shown) may be connected between pistons 84 and housing 12 to provide means for biasing the pistons to the left as viewed in FIG. 1 and out of engagement with friction disc 86, and if such a spring is included in transmission 10 its biasing force should merely be sufficient to overcome the force of fluid pressure acting to move pistons 84 to the right only when main clutch 18 is engaged as hereinafter explained.

A pump 124 draws fluid from a reservoir 126 and supplies it to chamber 72 via a fluid passage 128 in quill 44 which in turn communicates by way of an annular chamber 130 with a fluid passage 132 in housing 12. Each piston cylinder 82 communicates with annular chamber 130 to be acted upon by the fluid pressure therein, and flanged portion 64 of collar 62 has an orifice 134 therethrough in communication with the interior of housing 12 so that fluid supplied by pump 124 will pass through chamber 72 and be directed through orifice 134 to spray on to the components of main clutch 18.

In operation, when main clutch 18 is engaged fluid from pump 124 may pass rather freely through chamber 72 and orifice 134 into the interior of housing 12 so that the fluid pressure within annular passage 130 which acts upon pistons 84 is relatively low. When it is desired to disengage main clutch 18 the operator manipulates yoke 74 to move collar 62 toward the left, as viewed in FIG. 1, so that side 68 of groove 66 moves into closer proximity with end 70 of sleeve 56. With such valving movement the resistance to fluid flow through chamber 72 is increased, thereby increasing the fluid pressure within chamber 72, so that the operator is aided in his effort to disengage main clutch 18 by the fluid pressure force acting upon end 70 of sleeve 56 to move throwout bearing 58 to the left into engagement with throwout levers 38. When main clutch 18 is disengaged the back pressure in annular chamber 130 is increased to a level selected so that pistons 84 will move to the right with a selected force under the influence of this pressure into engagement with disc 86 so that rotatable disc 98 is frictionally clutched between discs 86 and 88 to thereby brake the rotation of rotatable disc 98. As the rotative speed of rotatable disc 98 slows spring 100 is coiled an amount sufficient to permit one of the surfaces 116 or 120 of tab 114 to abut the respective surface of flatted portion 104 so that the braking torque extered upon disc 98 is transferred through quill shaft 102 to stop the rotation of the main shaft. When main shaft 16 has come to a stop spring 100 recoils to release its potential energy and the main shaft is again centered relative to the tab 114 on rotatable friction disc 98. As long as main clutch 18 is disengaged the relatively high pressure in annular chamber 130 acts through pistons 84 to hold friction disc 98 from rotation and therefore main shaft 16 may not rotate during this time, but since main 16 is resiliently connected to disc 98 via coiled spring 100 the main shaft may pivot slightly either clockwise or counterclockwise within the bounds defined by tab 114. Such limited angular pivotal freedom of main shaft 16 is sufficient to permit splines 24 of collar 22 to be moved into engagement with splines 26 of gear 20 even if shaft 16 has stopped at an angular position whereat the ends of splines 24 would abut the ends of spline 26, such engagement being facilitated by chamfers indicated at 136 which may be formed in the ends of splines 24 and 26.

While we have described and illustrated herein a transmission embodying one form of this invention, it will be appreciated that other mechanisms may be devised which employ out inventive concept. It should therefore be understood that we intend to cover by the appended claims all mechanisms and modifications as fall within the full spirit and scope of out invention.

We claim:

1. A transmission comprising:
   a housing,
   a rotatable torque input member,
   a rotatable torque receiving member mounted for rotation within said housing,
   main clutch means for selectively connecting said torque receiving member to be rotated by said torque input member,
   gear means carried by said torque receiving member for selective mating engagement with complementary gear means within said housing,
   brake means for braking the rotation of said torque receiving member upon operation of said main clutch means and comprising,
   a stationary friction member connected to said housing,
   a rotatable friction member adjacent said stationary friction member and rotatable about the axis of rotation of said torque receiving member, and
   means for resiliently connecting said rotatable friction member for rotation with said torque receiving member when the stationary and rotatable friction members are disengaged and for limited bidirectional rotation of the rotatable friction member relative to the torque receiving member when the stationary and rotatable friction members are engaged whereby said gear means and complementary gear means may operatively engage one another irrespective of the braked position of said torque receiving means, said resilient means also bidirectionally biasing said torque receiving member toward a selected angular position relative to said rotatable friction member.

2. A transmission as set forth in claim 1 also including piston means and means for supplying a selected pressure to act upon said piston, said piston means urging one of said friction members into braking frictional engagement with the other said friction member when said selected pressure acts upon said piston means.

3. A transmission as set forth in claim 2 wherein said piston means includes a plurality of cylindrical bores disposed axially in said housing and a cylindrical piston slidably disposed within each said bore.

4. A strasmission as set forth in claim 2 including main clutch disengaging means for disconnecting said torque receiving member from rotation with said torque input member, and wherein said means for supplying a selected pressure is responsive to said main clutch disengaging means so that said selected pressure is supplied to said piston means only when said main clutch is disengaged.

5. A transmission as set forth in claim 1 and including:
   a pump,
   main clutch disengaging means for selectively disconnecting said torque receiving member for rotation with said torque input member when said clutch disengaging means is acted upon by a first selected pressure,
   piston means for urging one of said friction members into braking frictional engagement with the other said friction member when said piston means is acted upon by a second pressure selected relative to said first selected pressure,
   fluid passage means connecting said pump with said clutch disengaging means and with said piston means, and
   valve means for varying the pressure supplied by said pump to said clutch disengaging means.

6. A transmission as set forth in claim 5 wherein said piston means includes a plurality of cylindrical bores disposed axially in said housing and a cylindrical piston slidably disposed within each said bore.

7. A transmission as set forth in claim 1 and including means for limiting the angular pivotal movement of said torque receiving member relative to said rotatable friction member.

8. A transmission as set forth in claim 7 wherein said limiting means includes a surface on said rotatable friction member adapted to abut a surface connected for rotation with said torque receiving member.

9. A transmission as set forth in claim 2 and including means for limiting the angular pivotal movement of said torque receiving member relative to said rotatable friction member.

10. A transmission as set forth in claim 5 and including means for limiting the angular pivotal movement of said torque receiving member relative to said rotatable friction member.

11. A transmission as set forth in claim 10 wherein said limiting means includes a surface on said rotatable friction member adapted to abut a surface connected for rotation with said torque receiving member.

12. A transmission as set forth in claim 5 wherein said resilient means is a torsional coiled wire spring connected to said rotatable friction member and to said torque receiving member.

13. A transmission as set forth in claim 11 wherein said limiting means includes a surface on said rotatable friction member adapted to abut a surface connected for rotation with said torque receiving member.

14. A transmission comprising:
    a housing,
    a rotatable torque input member, a rotatable torque receiving member mounted for rotation within said housing, main clutch means for selectively connecting said torque receiving member to be rotated by said torque input member, a stationary friction member connected to said housing, a rotatable friction member adjacent said stationary friction member and rotatable about the axis of rotation of said torque receiving member, and means connecting said rotatable friction member for rotation with said torque receiving member comprising a tab on one of said members loosely received in a slot in the other of said members, resilient means connected to normally center said tab in said slot, and, said connecting means permitting a selected amount of limited bi-directional angular pivotal movement between said rotatable friction member and said torque receiving member.

15. A transmission as set forth in claim 14 wherein said connecting means includes a surface on said rotatable friction member adapted to abut a surface connected for rotation with said torque receiving member.

* * * * *

UNITED STATES PATENT OFFICE
CERTIFICATE OF CORRECTION

Patent No. 3,743,070　　　　　　　　　Dated　3 July 1973

Inventor(s)　Wayne R. Howard; Richard L. Ratliff

It is certified that error appears in the above-identified patent and that said Letters Patent are hereby corrected as shown below:

Abstract, line 5, delete "te" and insert -- the --.
Column 1, line 54, delete "netural" and insert -- neutral --.
Column 2, line 23, after "means" insert -- i.e., spring, --.
Column 2, line 41, delete "veiw" and insert -- view --.
Column 3, line 55, delete "speicifically" and insert -- specifically --.
Column 5, line 2, delete "extered" and insert -- exerted --.
Column 5, line 26, delete "out" and insert -- our --.
Column 5, line 29, delete "out" and insert -- our --.
Column 5, line 60 (claim 1, line 30), delete "means" (first occurrence) and insert -- member --.
Column 5, line 66 (claim 2, line 3), after "piston" (first occurrence) insert -- means --.
Column 6, line 7, delete "stransmission" and insert -- transmission --.
Column 6, line 14 (claim 4, line 8), after "clutch" insert -- means --.
Column 6, line 19, delete "for" and insert -- from --.
Column 6, line 36 (claim 6, line 4), after "each" add -- of --.
Column 6, line 36 (claim 6, line 4), delete "bore" and insert -- bores --.
Column 6, line 61 (claim 13, line 1), delete "11" and insert -- 12 --.

Signed and sealed this 2nd day of April 1974.

(SEAL)
Attest:

EDWARD M. FLETCHER, JR.
Attesting Officer

C. MARSHALL DANN
Commissioner of Patents